United States Patent [19]

Forrest

[11] Patent Number: 5,229,018

[45] Date of Patent: * Jul. 20, 1993

[54] COMPLETION AND WORKOVER FLUID FOR OIL AND GAS WELLS COMPRISING GROUND PEANUT HULLS

[76] Inventor: Gabriel T. Forrest, Bering Place II, 800 Bering Suite 301, Houston, Tex. 77257

[*] Notice: The portion of the term of this patent subsequent to Feb. 11, 2009 has been disclaimed.

[21] Appl. No.: 724,729

[22] Filed: Jul. 2, 1991

Related U.S. Application Data

[63] Continuation-in-part of Ser. No. 534,890, Jun. 7, 1990, abandoned, which is a continuation-in-part of Ser. No. 233,895, Aug. 15, 1988, abandoned, which is a continuation of Ser. No. 25,995, Mar. 16, 1987, abandoned, which is a continuation-in-part of Ser. No. 831,850, Feb. 24, 1986, abandoned.

[51] Int. Cl.⁵ .......................... E21B 43/00; C09K 7/02
[52] U.S. Cl. .................................. 252/8.551; 166/283; 507/104
[58] Field of Search ............................ 507/104; 175/72; 252/8.551; 166/283

[56] References Cited

U.S. PATENT DOCUMENTS

| | | | |
|---|---|---|---|
| 2,351,434 | 6/1944 | Jessen et al. | 252/8.5 |
| 2,815,079 | 12/1957 | Goins, Jr. et al. | 166/29 |
| 2,873,250 | 2/1959 | Scott, Jr. | 252/8.5 |
| 2,943,679 | 7/1960 | Scott, Jr. et al. | 166/21 |
| 2,986,538 | 5/1961 | Nesbitt et al. | 260/14 |
| 3,217,801 | 11/1965 | Fast et al. | 166/42 |
| 3,245,469 | 4/1966 | Bertness | 166/39 |
| 3,364,995 | 1/1968 | Atkins et al. | 166/280 |
| 3,574,099 | 4/1971 | Ryals et al. | 252/8.5 |
| 3,629,102 | 12/1971 | Lummus et al. | 252/8.512 |
| 4,082,677 | 4/1978 | Zollar et al. | 252/8.5 |
| 4,353,509 | 10/1982 | Bostian, Jr. | 241/24 |
| 4,391,925 | 7/1983 | Mintz et al. | 252/8.512 X |
| 4,397,354 | 8/1983 | Dawson et al. | 252/8.512 X |
| 4,503,170 | 3/1985 | Drake et al. | 252/8.51 X |
| 4,559,149 | 12/1985 | Shell | 252/8.51 X |
| 4,568,392 | 2/1986 | Dawson et al. | 252/8.512 X |
| 5,076,944 | 12/1991 | Cowan et al. | 507/104 |
| 5,087,611 | 2/1992 | Forrest | 507/104 |

OTHER PUBLICATIONS

"World Oil's 1990 Guide to Drilling, Completion, and Workover Fluids," *World Oil*, (Jun. 1990), pp. 68–108.

*Primary Examiner*—Gary Geist
*Attorney, Agent, or Firm*—Arthur F. Zobal

[57] ABSTRACT

This invention relates to the optimum formulation of workover and completion fluids used in oil, gas, water, or mineral recovery wells. Specifically, it discloses a method of processing peanut hulls and combining these with a suitable suspending agent in order to effect a seal against permeable formations during workover, completion, coring, drill-stem-testing, or drilling operations, without causing permanent permeability damage. Moreover, it discloses that when the procedures discovered are practiced as taught by this invention, the sealing action is reversible by simple fluid circulation and placing the well on production.

18 Claims, 4 Drawing Sheets

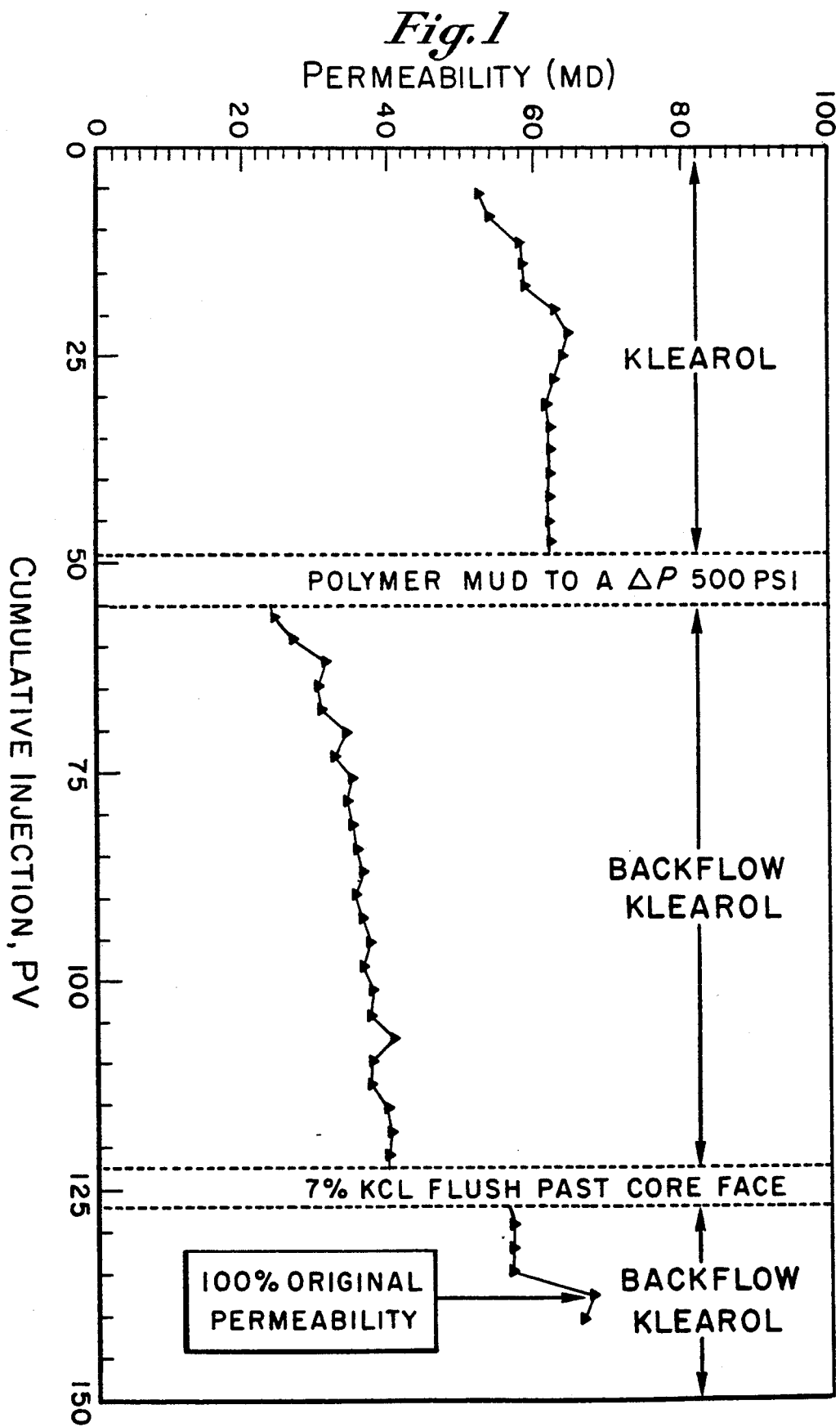

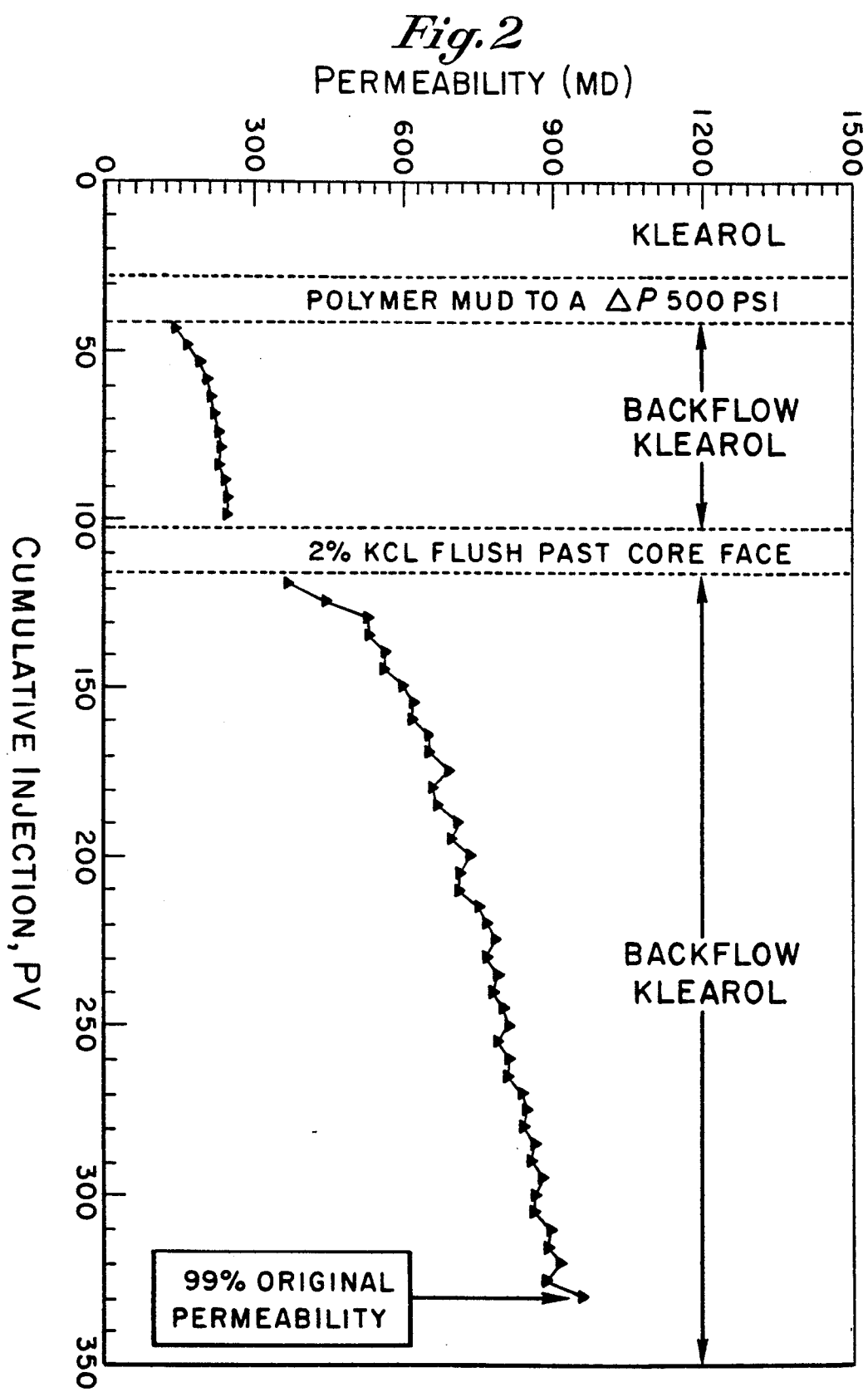

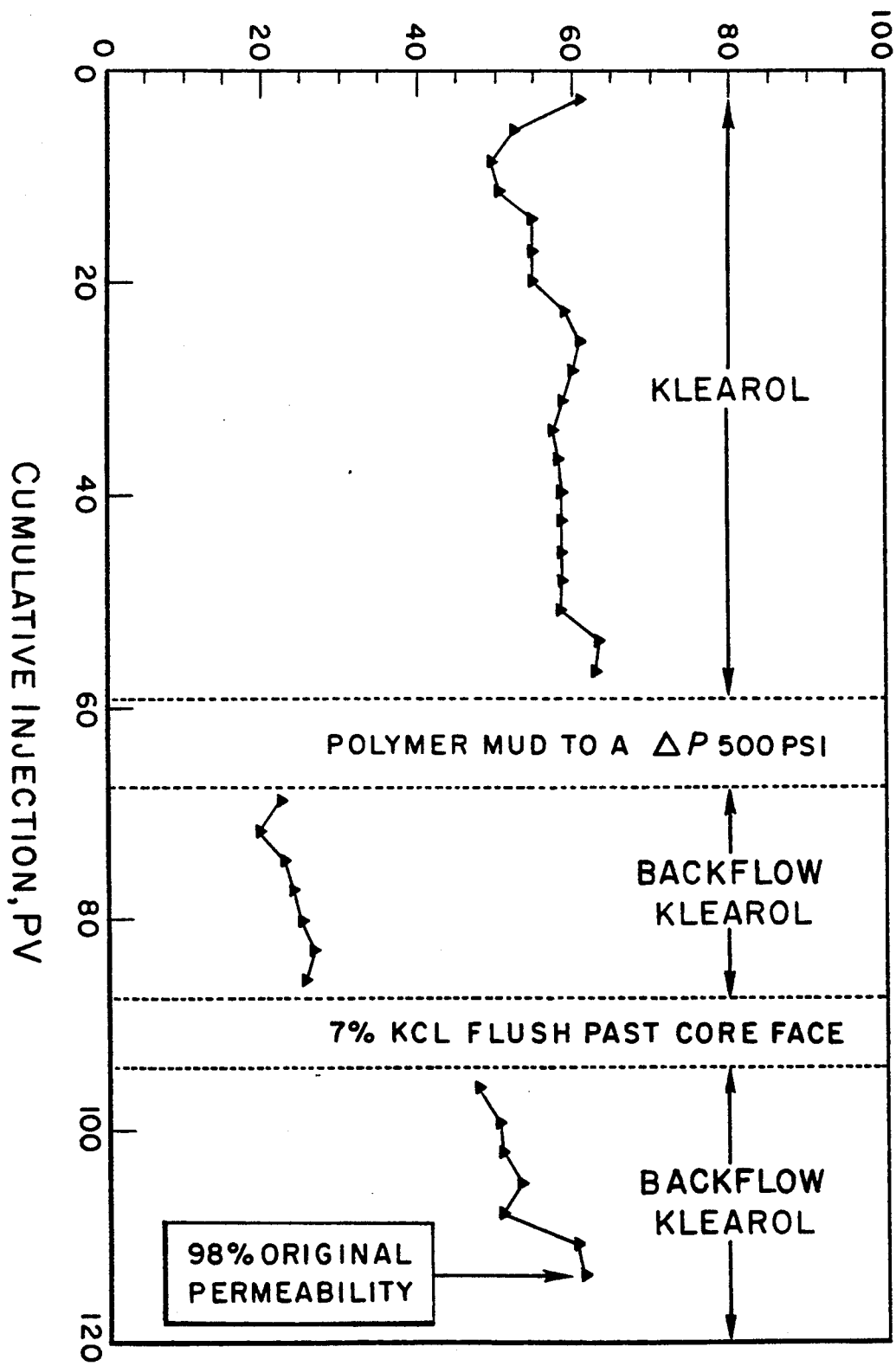

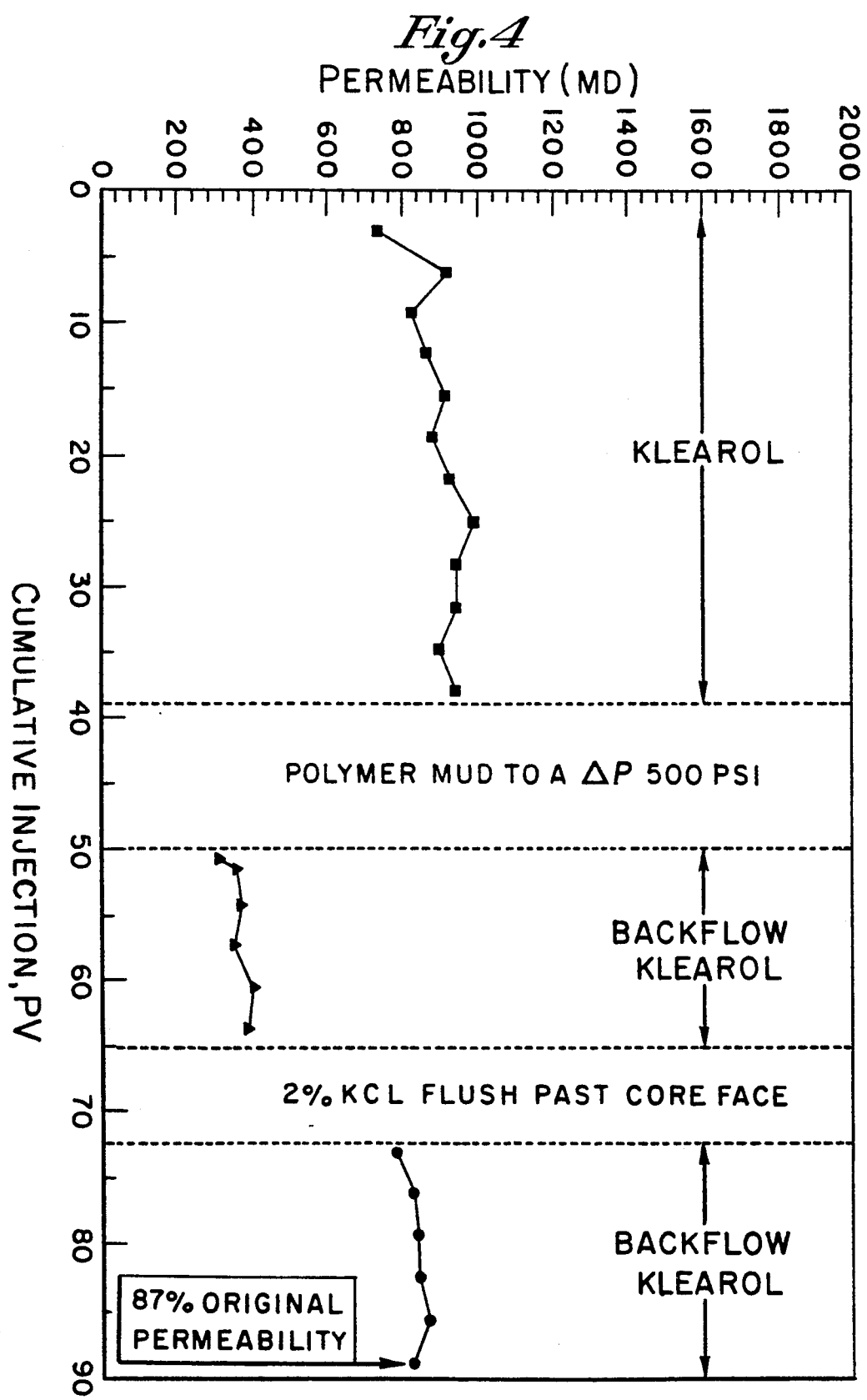

COMPLETION AND WORKOVER FLUID FOR OIL AND GAS WELLS COMPRISING GROUND PEANUT HULLS

This patent application is a continuation-in-part of U.S. patent application Ser. No. 07/534,890, filed Jun. 7, 1990 now abandoned, which is a continuation-in-part of U.S. patent application Ser. No. 07/233,895, filed Aug. 15, 1988, now abandoned, which is a continuation of U.S. patent application Ser. No. 07/025,995, filed Mar. 16, 1987, now abandoned, which is a continuation-in-part of U.S. patent application Ser. No. 06/831,850, filed Feb. 24, 1986, now abandoned. U.S. patent application Ser. No. 07/537,169 now U.S. Pat. No. 5,102,866 was filed on Jun. 12, 1990, as a continuation of Ser. No. 07/233,895.

BACKGROUND OF THE INVENTION

1. Field of the Invention

This invention relates to the discovery of the optimum singular soft organic material, and its particle-size range concentration, combined with a suitable clay or polymer viscosifier, which will completely seal seepage loss of workover or completion fluids in permeable, pressure depleted formations. This invention will replace the need for sized limestone, calcium carbonate, or salt and their inherent disadvantages. This new processed material will also eliminate the usual need for a fluid loss control agent, such as starch, mica, etc.

Workover and completion fluids are used to rework a drilled well, or to complete an oil, gas, or mineral recovery well after it has been drilled. The fluid which was used to drill the well is sometimes used to complete the well; however, this fluid frequently interferes with either the completion operations, or production of the well when these procedures are finished. Therefore, workover and completion fluids, non-damaging to the formation are needed.

2. Description of the Prior Art

In U.S. Pat. No. 3,198,268, Aug. 3, 1965, Lindblom, et al, disclosed the development of fermentates produced in carbohydrate solutions of the bacteria of genus Xanthomonas. The resulting product, Xanthan gum, had characteristics similar to bentonite clay slurries used to drill oil and gas wells, but did not have the detrimental effects to completion operations as the clay slurries.

However good Xanthan gum is as a viscosifier, it lacks fluid loss control needed for a completely non-damaging fluid. Typical fluid loss or seepage control agents, such as starch, mica, hard nut shells, etc., are too permanent, and interfere with production of the well after completion.

The use of finely divided calcium carbonate (limestone) as a fluid loss agent, combined with viscous fluids such as hydroxyethylcellulose or polyoxyethylene was described by Barkman, et al, in U.S. Pat. No. 3,516,496, Jun. 23, 1970. Barkman, et al, also discovered that guar gum damaged formations, and was not recommended as a viscosifier.

The disadvantage of calcium carbonate as a fluid loss sealing agent is that it must be dissolved with acid before the well can be brought into production. Mondshine in U.S. Pat. Nos. 4,175,042, 4,186,803, and 4,369,843, discloses the use of high concentrations of sized salt as a sealing agent, when combined with the various viscosifiers previously described. His procedures require that the salt solution be super-saturated, so that the sized salt will not dissolve, and thus lose its sealing effect. This is difficult to achieve in practice because deep wells are much hotter at bottom hole than on the surface, so the salt tends to dissolve as it is pumped down hole. The process of removal requires that a non-saturated water solution be used to wash the salt away, when other completion or workover operations are finished. This can be dangerous as the non-saturated water is lighter than the super-saturated fluid used to complete the well, and a "kick" may occur.

SUMMARY OF THE INVENTION

What the present invention proposes is to replace the need for sized calcium carbonate (limestone), or sized, super-saturated salt, with very finely ground peanut hulls, which require neither an acid treatment, nor a water flush. It has been discovered that properly ground and sized peanut hulls stick neither to themselves, nor to the formations rock, and thus excellent return permeability is achieved with normal completion and workover procedures.

The patent literature is replete with examples of various agricultural waste products being used as lost circulation materials (LCM), and seepage control agents. The performance of these materials is usually tested by two standard industry methods described in API RP-13I, using either a series of slots, or a marble bed to seal under pressure. Typical LCM concentrations required are usually above 10 pounds per barrel of drilling mud, and not exceeding 30 pounds per barrel, due to severe viscosity problems at higher concentrations. However, most materials which pass this test are not suited for completion or workover operations for the reasons mentioned before.

Also, the standard API LCM apparatus does not test for seepage loss phenomena. The best material found in testing, using the standard API LCM test apparatus, was the hard portion of nut shells (from trees), with walnut and pecan shells being the best. This is described by P. P. Scott, et al, in U.S. Pat. No. 2,943,680, Jul. 5, 1960. This singular material was improved upon by Ryals, et al, in U.S. Pat. No. 3,574,099, by using a mixture of asbestos fibers and granular particles (hard nut shells). However, asbestos fibers have since been found to be extremely hazardous, and are now prohibited for use in drilling or completion operations.

Lummus, et al, solved the hazardous problem by a three component mixture, described in U.S. Pat. No. 3,629,102, Dec. 21, 1971. This mixture was (1) +100 mesh ground hard nut shells, (2) −100 mesh hard nut shell flour, and (3) water-proofed sugar cane fibers. The hard nut shells were described as having a compressive strength of at least 5,000 pounds per square inch, a modulus of elasticity of at least 10,000 pounds per square inch. Black walnut shells were given as an example of a material meeting this criteria. It was found that if the above mixture contained at least 25% of these hard nut shells, a standard 0.04 inch slot could be sealed, whereas a singular material in this range would fail.

Lummus, et al in U.S. Pat. No. 3,629,102 also taught that particle-size distribution was not the single criterion for mixtures of granular and fiber particles to work. Only hard nut shells, hard nut flour, and sugar cane fibers worked with the distribution described above. Black walnut shells were described as the nut shells actually tested.

Peanut shells were not mentioned in Lummus' patent, but Lummus, et al, describes their invention as an improvement on Scott's U.S. Pat. No. 2,943,680, which specifically listed peanut shells as being unsatisfactory. Lummus, et al also taught that just fine, sized granular particles were not enough. He specifically found that ground shale and ground limestone would not perform very well.

Lummus also stated at the bottom of column 3 of U.S. Pat. No. 3,629,102 that "The particle-size distribution of the strong deformable or malleable particles passing a No. 100 sieve is not too critical." This is in contrast to our findings that the most optimum grind for finely ground peanut hulls are in this 100 standard sieve mesh size range.

Sized calcium carbonate and sized salt, as describe previously, are commercially sold as lost circulation and seepage control materials, but it is known that these just slow down the fluids' loss into permeable formations, and these also have the disadvantages described above.

An object of the present invention is to provide a singular material that will replace these marginal materials, and also replace the need to use complex mixtures, such as described by Lummus, et al, in U.S. Pat. No. 3,629,102, and combine this with a suitable non-damaging viscosifier.

DESCRIPTION OF THE INVENTION

Instead of sized calcium carbonate, salt, or the hard portion of nut shells from trees, such as walnut or pecan, my invention uses the soft portion of a legume, peanut hulls. Raw unground peanut hulls, along with cottonseed hulls, etc., were specifically described in U.S. Pat. No. 2,943,680 as being unsatisfactory, but I have found that if they are ground fine enough, and combined with a suitable non-damaging viscosifier, the resultant product is a superior material to use with typical brine water, to make up a non-damaging drilling, workover or completion fluid.

An object of this invention is to provide a singular sealing material which will seal highly permeable formations, when combined with a suitable viscosifier as a suspending agent. Preferably a dry mixture of the sealing material and viscosifier is formed, which is mixed with a fluid to be circulated in a bore hole.

An additional object of this invention is to describe an optimum combination of materials for this purpose. In light of the prior art, the discovery that a heretofore unsuitable material, peanut hulls, when properly ground, was the optimum raw material to process for this purpose was a surprise.

Another object of this invention is to describe the optimum economical particle-size distribution for this material. This determination is critical for three reasons: (1) Economics; the finer the grind, the more costly the processing. (2) Production; the finer the grind, the longer it takes to produce a given quantity to specifications. (3) Performance; it was previously known that unground peanut hulls were unsatisfactory (U.S. Pat. No. 2,943,680). It was observed in both field trials and in lab tests that either too course a grind, or too fine a grind was detrimental to the sealing performance desired.

Every conceivable agricultural waste product has been tried as a workover, completion, or drilling fluid additive. Raw, unground peanut hulls have been tried and lab tested, and found to be totally unsatisfactory on several accounts: First, they are costly when compared to cottonseed hulls, sawdust, straw, etc., as peanut hulls are really not waste, but used as fiber in animal feeds. Second, peanut hulls fail every standard industry test for lost circulation materials, and cause increased fluid loss in the standard API test cell, acting rather as a filter aid, producing the reverse effect, at least on filter paper, to what is desired. Third, and most important, most all natural cellulosic absorb so much water when added to a workover, completion, or drilling fluid that the resulting slurry becomes too thick to pump before a concentration is reached that will effect a seal against or within the subterranean formations.

After much testing, it was discovered that when a grind range was reached between 20 standard sieve mesh and 200 standard sieve mesh, with a median size between 50 and 100 standard sieve mesh, that a layer of natural lignin is exposed. Laboratory tests have determined that the composition of peanut hulls is 35 to 45% cellulose, and 27 to 33% lignin. Since lignin is a natural slurry thinner, this lignin exposure allows a much higher concentration of this particular natural cellulose that was not possible before.

Those who practice this art know that the normal range of concentration of natural cellulosic materials, such as cottonseed hulls, bagasse, corncobs, etc., is between 10 and 30 pounds per barrel, above which most slurries become too thick to pump. However, I have discovered if the concentration of the viscosifier is adjusted downward from what is normally used, that up to 60 pounds per barrel of the above grind range can be added. Therefore, whatever concentration that will effect a seal is now possible, and the resulting slurry can still be pumped.

Another very important object of my invention is to provide a sealing agent that also is non-damaging to producing formations, or in formation horizons to be tested by coring or drill-stem-tests. Return permeability tests, described in the test data section, have shown that the effective grind range of peanut hulls functions because of the chemical and physical nature of the starting material and the precise mechanical alterations of the processing.

In order for the material to perform as a non-damaging sealing material, the material has to have a precise particle range and sufficient concentration to shut off fluid flow, and then have the proper water absorbency for swellability to be removable by subsequent pressure reversal and fluid circulation past the filter cake formed at or within the surface of the porous formation.

Yet still another object of this invention has become apparent. That is, with an effective sealing agent, such as my invention, the concentration of expensive viscosifiers can be reduced, thus reducing the costs of preparing and maintaining workover, completion, and drilling fluids. Not only is the cost of the workover or completion fluid lower, but because of an effective seal produced by my invention, the virtual elimination of stuck pipe, and stuck drill-stem-test tools will greatly lower the costs of workovers and completions.

Another object of this invention is to circulate a fluid containing a sealing agent and a viscosifier in a bore hole for drilling, completion, or workover purposes.

TEST DATA

The discovery which lead to this invention came about by testing various commonly available materials, using a modified test procedures with an API filter press test cell. The standard fluid loss procedure was modified by substituting −20 +40 sand for the filter paper usually used in the cell. Air pressure of 100 psi was applied for ten minutes, instead of the usual 30 minutes.

If all the mud passed through the sand, the seepage was considered uncontrolled, and the results were marked (U). If more than half of the mud seeped through before a seal, the seepage was considered to be somewhat controlled, and the results were marked (C). If less than half seeped through in ten minutes, some sealing was considered to have occurred, and the results were marked (S). The result desired was that seal-off would occur before any fluid seeped through; these desirable results were marked (SO).

This modified test procedure was intended to simulate pressure depleted, highly permeable zones that cause seepage losses. In the bore hole, a thick filter cake is formed on these zones, which prevent lost circulation, but cause a high incidence of stuck drill pipe and other bore hole tubulars and tools.

Using this modified test procedure, it was found that commonly available organic materials either failed, or performed only at concentrations exceeding 10 pounds per barrel. This data is shown in Table I. The base mud was 22 pounds per barrel (ppb) of Wyoming API Grade Bentonite, dispersed with 4 ppb of ferric lignosulfonate, with pH adjusted to 9.5 with sodium hydroxide, and aged overnight. (An oil field barrel is 42 gallons, or 350 pounds of water).

"Kwik-Seal" (a mixture of walnut shells, cellophane, and bagasse.), and "Ven Fyber" (processed from cotton plants) are commercial products that are typically used to control both lost circulation and seepage.

Various uncommonly available materials were then tried: Ground cotton fibers, pine cones, cactus fibers, rice hulls, and peanut hulls were those specifically tested. To my surprise, only finely ground peanut hulls sealed at 10 pounds per barrel, and they were even effective down to 5 pounds per barrel. These results are shown in Table II.

A commercial, high volume grinding mill was purchased and modified to produce singular grinds in nine ranges from −3 mesh to −500 mesh. These carefully sized groups were: −3 +5, −5 +10, −10 +20, −20 +50, −50 +100, −100 +200, −200 +325, −325 +500, and −500 mesh.

Ten pounds per barrel of each of these grinds of peanut hulls were then tested, using the modified fluid loss test procedure described previously. As shown in TABLE III, the grind is critical, as sealing performance is lost above 20 mesh, and again lost below 200 mesh. This leave −20 to +200 mesh as the effective grind range that is needed for complete seal-off of seepage at 10 pounds per barrel.

Microscopic examination revealed that the hulls contain layers, which upon only grinding to the −20 to +200 mesh size, provide the variation in shapes and sized with varying strengths that are necessary to provide the sealing action desired. Chemical analysis of peanut hulls indicates the following composition: 8–10% Moisture; 6–7% Crude protein; 1% Fat; 35–45% Cellulose; 27–33% Lignin; and 3–4% Ash.

Additionally, the hulls possess a very high water adsorption rate, which is detrimental to the viscosity properties of drilling fluids. However, when the particles are ground into the −20 to +200 range, an inner layer, which contains the lignin, is exposed, and this counteracts the water absorbency by producing a thinning of viscosity.

This discovery has not been disclosed in any past patents that I researched. Not knowing this one fact is probably why peanut hulls have previously been dismissed as unsatisfactory, and not further researched.

However, peanut hulls are much more difficult and costly to grind than hard granular materials, described in past patent literature previously discussed. Therefore, to make this material cost effective, as well as technically effective, it was necessary to find the lowest practical concentration within a range of courser, and thus less costly, peanut particles. Therefore, another object of this invention is to disclose this optimum concentration.

Three composite mixtures were prepared from the singular grinds described above. These were tested with the coarsest grind (−3 +5) varying from 50% down to 10% of the blend, and the finest grinds (−325) inversely varying from 10% up to 60%. It was found that 10% of a nominal 60 mesh (the middle range of −20 to +200) was effective at my targeted usage concentration of 10 pounds per barrel. This data is listed in TABLE IV.

The optimum particle-size range, −20 to +200 standard sieve mesh, of ground peanut hulls was then combined with a Xanthan gum and a Xanthan gum combined with a typical polyanionic carboxymethyl cellulose (PAC). Two 4 pound per barrel completion fluid slurries were then prepared from these mixtures in a 2% KCl solution.

Stock Berea and Brady sandstone cores were then cut to 1 inch diameter and 2 to 3 inches length, and mounted in a standard Hassler sleeve, preheated to 180° F. with a closure pressure of 1500 pounds per square inch, and a back pressure of 800 pounds per square inch. The prepared completion fluid was injected into the cores until a differential pressure of 500 pounds per square inch was achieved; the core was then shut-in for 3 hours.

Following shut-in, a standard Klearol oil permeability regain was determined to measure the amount of damage; a 7% KCl solution was flushed across the face of the core, and Klearol return permeability was determined.

The effectiveness of a particulate fluid loss additive often depends on the ratio of the size of the particulate to the pore throat size. For example, if the particle-size is too large, small pores may not be effectively bridged; if the size is too small, the particle may enter the pore, and while it may control fluid loss, it can permanently block permeability, causing irreversible damage.

Therefore, the study was conducted with a low permeability, 50 milli-Darcy core, and a high permeability, 1 Darcy core. This was to examine the permeability range where the ground peanut hulls are applicable. A portion of the 4 pounds per barrel completion fluid slurry was tested to determine its rheological properties; these results are listed in Table V.

The effectiveness of a brine flush in removing a polymer mud filter cake has not be observed previously in a large number of other polymer and clay-based fluids examined. Therefore, the non-damaging results obtained by these laboratory tests are unexpected and contrary to previous experience, which is that most effective mud filter cakes are usually very resistant to removal by flush fluids. This was confirmation that my invention was indeed non-damaging and different from fluid loss sealing agents in prior art.

The return oil permeability following mud-off alone ranged from 25% to 40%, depending on permeability of the core, and the type of polymer viscosifier. The brine flush stage is required to obtain the final regain in oil permeability.

However, these results indicated that a properly prepared formulation of my invention should effectively control fluid loss in brine weights up to saturated Calcium Chloride, and over a wide range of formation permeabilities with various types of polymer viscosifiers typically available for such formulations. The insitu seal and remaining filter cake can be effectively removed from the formation with little or no impairment by first circulating a brine flush, followed by oil, gas, water, or mineral water production.

The flow experiments with the Berea core showed that the completion fluid prepared with my invention effectively stopped fluid flow through the core quickly at a differential pressure of 500 pounds per square inch. 100% return oil permeability, after a brine flush, demonstrated the low damage of this fluid in lower permeability cores.

The results with a 1 to 2 Darcy Brady sandstone core showed that the fluid was also effective and non-damaging to high permeability formations. Formation damage studies with polymer systems typically show permeability damage in a range of 5% to 40%, depending on the polymer viscosifier used; furthermore, the re-exposure of the core to the polymer completion fluid usually results in much greater damage.

These tests showed that Xanthan gum, and/or PAC polymers, combined with the optimum grind of peanut hulls as disclosed in this invention, showed little or no damage, even on repeated exposure.

This indicates that the filter cake formed effectively and quickly, preventing polymer extrusion into the core, and thus limiting permanent permeability damage. Table VI shows the results of simulated fluid invasion in a 100 ft section of Berea sandstone.

TABLE I

| 10 Min Fluid Loss Through Sand Bed in API Filter Loss Cell | | |
|---|---|---|
| Material | Concentration | Fluid Through Sand Bed |
| Base Mud | | Uncontrolled |
| Fine Nut Plug | 10 ppb | Uncontrolled |
| Fine Mica | 10 ppb | Uncontrolled |
| Cottonseed Hulls | 10 ppb | Uncontrolled |
| Mineral Wool | 10 ppb | Uncontrolled |
| Med. "Kwik Seal" | 10 ppb | More than half |
| "Ven Fyber" | 10 ppb | Uncontrolled |
| "Ven Fyber" | 20 ppb | Sealed |

TABLE II

| Fluid Loss Through Sand of Non-Commercial Products | | |
|---|---|---|
| Material | Concentration | Fluid Loss Through Sand Bed |
| "Ven Fyber" | 20 ppb | Sealed |
| "Ven Fyber" | 10 ppb | Uncontrolled |
| −50 Cactus Fiber | 30 ppb | Less than half; partial seal |
| −50 Rice Hulls | 20 ppb | Less than half; partial seal |
| −50 Peanut Hulls | 20 ppb | Sealed |
| −50 Peanut Hulls | 10 ppb | Sealed |
| −50 Peanut Hulls | 5 ppb | Less than half; partial seal |

TABLE III

| Fluid Loss Through Sand of Specific Grinds: Peanut Hulls 10 Pounds Per Barrel For 10 Minutes | |
|---|---|
| GRIND | RESULT |
| Base Mud | Uncontrolled |
| −3 to +5 | More than half; marginal seal. |
| −5 to +10 | Less than half; partial seal. |

TABLE III-continued

| Fluid Loss Through Sand of Specific Grinds: Peanut Hulls 10 Pounds Per Barrel For 10 Minutes | |
|---|---|
| GRIND | RESULT |
| −10 to +20 | Less than half; partial seal. |
| −20 to +50 | Sealed completely. |
| −50 to +100 | Sealed completely. |
| −100 to +200 | Sealed completely. |
| −200 to +325 | Less than half; partial seal. |
| −325 to +500 | More than half; marginal seal. |
| −500 mesh | More than half; marginal seal. |

TABLE IV

Fluid Loss Tests Through Sand of Composite Grind Blends For 10 Pounds Per Barrel of Peanut Hulls To Form An Effective Seal

| BLEND NO. | −3 +5 | −5 +10 | −10 +20 | −50 +100 | −200 +325 | −325 |
|---|---|---|---|---|---|---|
| 1 | 50% | 10% | 10% | 10% | 0% | 10% |
| 2 | 25% | 10% | 10% | 10% | 10% | 35% |
| 3 | 10% | 0% | 10% | 10% | 10% | 60% |

TABLE V

Rheological Properties of 4 lbs/bbl of Ground Peanut Hulls With Indicated Polymer In 2% KCl Brine Completion Fluid Slurry.

| PARAMETER | XANTHAN GUM | PAC/ XANTHAN |
|---|---|---|
| 600 rpm Fann Viscosity: | 44 | 31 |
| 300 rpm Fann Viscosity: | 34 | 20 |
| Apparent Viscosity, cp: | 22 | 15.5 |
| Plastic Viscosity, cp: | 10 | 11 |
| Yield Value, lbs/100 ft$^2$ | 24 | 9 |
| Initial Gel Strength, lbs/100 ft$^2$ | 14 | 4 |
| 10 Min. Gel Strength, lbs/100 ft$^2$ | 20 | 6 |
| API Fluid Loss, cc/30 minutes: | 12.7 | 16.8 |

TABLE VI

SIMULATED FLUID INVASION INTO A 100 FOOT BEREA SANDSTONE WITH 4 LBS/BBL COMPLETION FLUID OF THIS INVENTION

| SIMULATED WELL DATA | | CORE DATA USED FOR SIMULATION | |
|---|---|---|---|
| Interval | 100 feet | Core Diameter | 1.01 inches |
| Shots/Ft | 12 | Porosity | 0.14 |
| Perforations | 0.25 inches | Permeability | 60 md |
| Perforation Length Tunnel | 6 inches | Pressure Differential: | 500 psi |
| Cone | 2 inches | | |
| Shot Efficiency | 0.8 | Pore Volume | 4.00 ml |
| Calculated Invasion: | 2.3 gallons. | Filtrate Volume: | 1.80 ml |

In order to complete an oil, gas or mineral well and place it into production, certain steps are essential, and other steps are desirable.

The essential steps are these: First, a bore hole must be drilled through a permeable rock formation containing the hydrocarbon or mineral to be produced; such rock formation is called the reservoir.

Second, a fluid must be circulated in order to remove the rock being drilled and to remove the sediments from formations previously drilled that fall into the hole and settle to the bottom; these sediments will greatly interfere with completion and production procedures by forming a mud cake against the reservoir as fluid seeps into the permeable formation.

Third, wireline tools, production tubing, packers, and pumps, if any, must be placed into the reservoir portion of the hole, without getting stuck in the mud cake on the bore hole walls.

Fourth, the density of the completion fluid is lowered so that the hydrostatic pressure that has kept the well from blowing out during the completion procedures, now allow reservoir hydrocarbons or minerals to flow into the bore hole and be produced.

Fifth, the lighter completion fluid is circulated past the reservoir in such a manner that the mud cake that has formed against the rock and prevented fluid from entering the formation is now washed clear, so that it does not interfere with the well production.

The desirable steps are these: First, the fluid being circulated should have a low fluid or seepage loss into the permeable reservoir rock. Usual materials to control this also seal the rock and interfere with the flow of hydrocarbon or mineral into the bore hole when production is attempted.

The second desirable step is to use fluid loss or seepage control materials that seal temporarily, but do not seal permanently: Sized salt (NaCl) granules in saturated brines can be used, then dissolved by using less concentrated brine water to circulate past the reservoir, just prior to production; Also, granulated oyster shells or limestone (CaCO3) can be used and dissolved by circulating acid (HCl).

The key word in both the essential and desirable steps of completion is that the completion fluid must be circulated.

I have discovered that extremely fine ground peanut hulls, which is in powder form, and will pass through a wire screen having 100 wires per inch, in combination with an appropriate concentration of viscosifier, will seal reservoir rock which is as permeable as 1000 millidarcys, when used in such a concentration that at least four pounds of the sealing agent per 42 gallon barrel of completion fluid is present in the final mixture.

Since peanut hulls are not hard and brittle, they are extremely difficult and costly to grind into the effective form describe above. Viscosified completion fluid containing four pounds or more of the peanut hulls, ground to pass through a 100 mesh screen, per barrel of fluid will seal and prevent seepage only while the hydrostatic pressure in the bore hole is greater than the pressure in the reservoir rock, thereby preventing the well from blowing out with uncontrolled production, and also preventing permeability damage due to fluid seepage into the reservoir rock. Unground peanut hulls do not seal and, in fact, act as a filter aid allowing more seepage to occur.

However, when production tubing and tools are in place and production is attempted by circulating a less dense fluid past the reservoir rock, such that the pressure in the reservoir is greater than the hydrostatic pressure in the bore hole, the seal formed by the extremely fine ground peanut hulls is broken, and the material disperses back into the completion fluid being circulated, and is cleaned off the surface wall of the reservoir rock.

The means that sized salt does not have to be used, which is good because circulating fresher water sometimes damages the reservoir rock's permeability. The use of the extremely fine ground peanut hulls will also eliminate the need to use corrosive and dangerous acid to dissolve sized oyster shells or limestone (CaCO3). Extremely fine ground peanut hulls are not dangerous, and are environmentally safe for disposal.

For drilling purposes, the drilling fluid may be water, brine, or oil, in which the ground peanut hulls and viscosifier are mixed. Circulation of the fluid in the bore hole for drilling purposes may be carried out as disclosed in U.S. Pat. No. 2,815,079. A surface pump is usually employed to pump the fluid through the drill pipe.

For completion or workover purposes, the circulating fluid may be water, brine, or oil, in which the ground peanut hulls and viscosifier are mixed. Circulation of the resulting mixture in the bore hole may be carried out by a surface pump for pumping the fluid through a pipe inserted into the bore hole. The fluid will flow out of an opening at the lower end of the pipe and back through the annular space between the pipe and the bore hole walls to the surface.

METHOD OF PREPARATION OF DRY PRODUCT

The most convenient way to prepare a completion fluid is to supply the ingredients in dry form that can be added in appropriate concentrations to water or brine for make up at rig site locations.

For effective sealing of rock permeability, we have established that 2 to 8 pounds per barrel of peanut hulls ground to a precise range, wherein at least 10% are in $-10+20$ mesh, another 10% are in $-50+100$ mesh range, is necessary to effect both sealing and return permeability against reservoir rock. This mixture must then be combined with a suitable viscosifier, in a ratio such that both proper rheological and sealing properties result at a reasonable concentration of the final material.

Since peanut hulls are costly to grind below 20 mesh in a one pass operation, $250 per ton compared to $5 per ton for sawdust, the grinding process is cascaded, and the processed product is blended so that the final grind falls within the ranges shown in Table IV.

Non-Clay Based Product: For a fluid non-damaging to reservoir rock's permeability, a non-clay based viscosifier is preferred. Xanthan gum, previously described, is preferred. At least eight pounds of the finely ground processed peanut hulls, described above, are added to each pound of Xanthan gum, and sacked, resulting in a final product. Four to six pounds of this is added to water or brine at rig site locations to prepare a completion fluid.

Clay Based Product: For preparation of a clay-based viscosifier, the ratio is entirely different. At least six pounds of the finely ground processed peanut hulls, described above, are added to each 16 pounds of clay viscosifier, sodium or calcium montmorillonite being the preferred clay. The product is sacked and ready to use at rig site locations. Twenty-two pounds per barrel of water of this product is normally required to make up the completion fluid.

BRIEF DESCRIPTION OF THE DRAWINGS

FIG. 1 is a plot of the data of formation damage testing with a low permeability Berea sandstone core. The completion fluid was prepared using deionized water in a Waring blender mixed at medium to high speed. The water was adjusted to a pH of 6 with dilute hydrochloric acid, and a Xanthan gum viscosifier was added to achieve a concentration of 0.57 by weight. Finely, ground peanut hulls with a particle-size range of less than $(-)20$ standard sieve mesh and greater than $(+)200$ standard sieve mesh, was added to a concentration of 2 pounds per barrel. The pH of the mixture was then adjusted to 8.0 with dilute sodium hydroxide and mixing was continued for 15 minutes to allow hydration to occur. Potassium chloride (KCl) was added to a concentration of 2% by weight. The pH was lowered to 6 with dilute hydrochloric acid just prior to loading into the core flow system reservoir.

This data shows effective sealing upon application of pressure and the regain permeability upon back flow. The return permeability to oil after a 7% FCl flush across the face of the core was 100% of original permeability.

FIG. 2 is a plot of the date of formation damage testing with a high permeability Brady sandstone core, using the completion fluid prepared as described above. The data again shows that this particle-size range of finely ground peanut hulls, formed an effective seal, even in this highly permeable rock. The return permeability to oil after a 2% KCl flush across the face of the core was 99% of original permeability.

FIG. 3 is a plot of the data of formation damage testing with a very high permeability Brady sandstone core. The completion fluid was prepared as described above, using a 4 pound per barrel mixture of 50% of the finely ground peanut hulls of 25% Xanthan gum (XAN-VIS), 25% Polyanionic Carboxymethylcellulose viscosifier in 2% KCl brine water. An effective seal was obtained even in this extremely permeable core, and 87% of original permeability was regained upon a 7% KCl flush across the face of the core.

FIG. 4 is a plot of the data of formation damage testing with a lower permeability Berea sandstone core, using a completion fluid prepared as described above, except containing a 50:50 ratio of Xanthan gum (XAN-VIS) and polyanionic carboxymethylcellulose as the viscosifier. An effective seal was obtained, and 98% of original permeability was regained upon a 7% KCl flush across the face of the core.

DESCRIPTION OF THE PREFERRED EMBODIMENTS

Based on the test data described above, it is apparent that the most effective particle-size range for sealing permeable subterranean formation rocks, using ground peanut hulls, is −20 to +200 standard sieve mesh.

It is also apparent that the reason that this is the critical range for effectiveness is because a layer of 27% to 33% lignin is exposed, which limits and delays the thickening effect caused by water absorption usually observed when natural organic materials are added to water. This delay in thickening action allows a much higher concentration of the finely ground peanut hulls to be added, than can be obtained using any other finely ground material that does not contain this lignin layer.

Because of the delayed thickening action imparted by the lignin layer exposed by grinding to −20 to +200 standard sieve mesh, and the high surface area to volume ratio material available to seal, a wide range of rock permeabilities may be sealed, so long as pressure is maintained against the rock. Virtually all of the original permeability may be regained upon simple flushing across the surface of the sealed formation, and pressure reversal when the well is tested or placed on production. It is also apparent that the −20 to +200 standard sieve mesh grind of peanut hulls is effective using a variety of viscosifier suspending agents.

The exposure of the lignin layer caused by precise grinding to the critical −20 to +200 standard sieve mesh particle-size range also allows a much wider range of concentrations of both the sealing agent, and of the viscosifier. Additionally, because of the delayed thickening action, the most economical combination of viscosifier type and concentration with the sealing agent may be formulated for the completion, workover, or drilling operation, and how sensitive the subject rock formation is to permeability damage from fluid invasion, and how severity of the bottom hole temperature.

For the most sensitive formations, the least damaging combination of my invention is preferred. This is 2 to 8 pounds per barrel (ppb) of the −20 to +200 mesh peanut hulls in a 0.057% by weight mixture of Xanthan gum, as the best non-damaging viscosifier. Unfortunately, this is also the most expensive product, being up to ten times more expensive than other possible ground peanut hull/viscosifier combinations.

Because Xanthan gum is so expensive, its concentration may be reduced by increasing the ratio of −20 to +200 mesh ground peanut hulls. The range of polymer viscosifier concentration is from 0.1 to 5.0 ppb, with the concentration of −20 to +200 ground peanut hulls varying inversely.

Some of my first laboratory tests used a relatively cheap, standard API bentonite clay. Bentonite is a water hydratable smectic inorganic clay, predominantly sodium or calcium montmorillonite, but which may also contain upwards to 40% micas, kaolinites, silicates. My invention may be used with any of these, but the ratio of ground peanut hull sealing agent to clay viscosifier has to be adjusted, depending on the clay type used, and the sensitivity of the subject formation to permeability damage.

For example, with a standard clay slurry of 22 pounds per barrel (ppb) of API bentonite, the clay concentration may be reduced 1 ppb for every ½ ppb of −20 to +200 ground peanut hulls used as the sealing agent; the concentration of the sealing agent needed will depend on the permeability of the subject rock and its sensitivity to damage.

As little as 5 ppb of the sealing agent has been tested, but as high as 60 ppb of my invention can be added for assured protection in extremely permeable, unconsolidated rocks, providing that the clay concentration is reduced inversely between a range of 1 ppb to 35 ppb. Sometimes the clay properties are enhanced by small polymer additions of polyacrylates, polyvinylacetates, and maleic anhydrides. Combining my invention with such clays as the viscosifier is the cheapest combination to use in formulating a completion, workover, or drilling fluid of my invention.

The concentration of these polymer clay property enhancers can range from ¼ pound per ton of clay to 5.0 pound per barrel, depending on the hydratable quality of the clay. Typical concentration with high quality (92 barrels per ton API yield) hydratable bentonite clay is between 0.02 to 0.1 pound per barrel.

In between the cost of the very expensive Xanthan gum/Ground peanut hull sealing agent combination and the very cheap Clay/Ground peanut hull sealing agent combination is a wide variety of other possible combinations.

The selection of which viscosifier/sealing agent combination depends on the rheological and fluid loss properties desired for the particular well operation and specific rock formation being completed, reworked, or drilled, and the salt composition of the make-up water.

In some cases, certain salts must be used to obtain a calculated water activity in order to match the water activity of the subject formation. In such cases, the viscosifier selected for use with the ground peanut hulls must be compatible with the ionic nature of the salts being used to match rock connate water activity.

Commonly used salts are Chlorides of Sodium, Calcium, Potassium, and Zinc; Sodium Bromide is sometimes used. When such salts are used, the preferred viscosifier will be a water-soluble polymer selected from the group of carboxymethylcellulose, hydroxyethylcellulose, hydroxypropyl guar, and commercial homologues of such polymers. The concentration of these polymers may range from as little as 0.1 ppb to 5.0 ppb for singular viscosifiers, but higher concentrations are possible, depending on the water-soluble quality of the polymer, or if several different polymers are used as the viscosifier; this latter case, the concentration could range up to 15 ppb.

In these concentrated salt slurries, if it is desired to use a cheap viscosifier/sealing agent combination, my invention may be formulated using fuller's earth, zeolitic clays, or attapulgite clay, which do not hydrate, but will provide the suspending qualities to carry the sealing agent.

Much higher concentration of these materials are needed than the hydratable clays described previously. Concentrations of 35 ppb of these non-hydratable viscosifiers would be typical, but could be double this in larger hole sizes or highly permeable formations, up to viscosifier concentration approaching or even exceeding 100 ppb. Using increasing ratios of −20 to +200 mesh ground peanut hulls as the sealing agent can bring the non-hydratable clay concentration needed down to as low a 4 ppb. Logistics and availability are also important factors in remote international locations. In cases where this is an important factor, if fresh or brine water can be used, then other water-soluble polymers, such as polyacrylates, polyacrylamide, or partially hydrolyzed polyacrylamide, polyvinylacetates and maleic anhydrides, may be used.

If solids, sand, or sloughing shale is a problem during the workover, completion, or drilling operations, than the preferred viscosifiers with the −20 to +200 ground peanut hulls are two specific water-soluble polymers: Either a partially hydrolyzed polyacrylamide, or a polyoxyethylene; the selection of which material will be dictated by the salt content of the water, economics, and chemical flushes or fracturing fluids planned. The polyoxyethylene is the most inert to salts and any chemical flush that is to be used, but the polyacrylamide is usually the most readily obtainable. One pound per barrel to 4 ppb of these viscosifiers with 20% to 50% of −20 to +200 mesh ground peanut hulls is the preferred formulation for such a completion, workover, or drilling fluid.

As can be seen from the above detailed discussion on completion fluid formulations of my invention, the concentration of the viscosifier/sealing agent combination can range from one pound per barrel of the mixture upwards to 60 pounds per barrel. This versatility is a great advantage of my invention, as it allows completion, workover, and drilling engineers to design not only the best fluid technically, but also the most cost effective fluid for the application at hand, and materials available within his logistical restraints.

What is claimed is:

1. An oil, gas, water, or mineral well completion, workover, or drilling slurry to be circulated in a borehole, comprising: a fluid, a sealing agent of ground peanut hulls of particles of a size distribution such that at least 30% but no more than 80% of said particles will be retained on a 100 standard sieve mesh and, a viscosifier to carry and suspend said sealing agent, said sealing agent and said viscosifier being present in said slurry at a concentration of at least one pound per 42 gallon barrel of said slurry.

2. The slurry of claim 1, wherein at least 10% of said particles will be retained on a 100 standard sieve mesh.

3. The slurry of claim 2, wherein at least 10% of said particles will pass a 50 standard sieve mesh.

4. The slurry of claim 1, wherein said viscosifier is Xanthan gum at a concentration greater than 0.1 pounds per 42 gallon barrel of said slurry, but less than 5.0 pounds per 42 gallon barrel of said slurry.

5. The slurry of claim 1, wherein said viscosifier is a water soluble polymer selected from the group consisting of carboxymethylcellulose, hydroxyethylcellulose, and hydroxypropyl guar.

6. The slurry of claim 1, wherein said viscosifier is polyoxyethylene

7. The slurry of claim 1, wherein said viscosifier is a polyacrylamide, or a partially hydroluxed polyacrylamide.

8. The slurry of claim 1, wherein said viscosifier is a water hydratable smetic inorganic clay at a concentration of at least 1 pound per barrel of said slurry and no more than 35 pounds per barrel of said slurry, said clay being selected from the group consisting of saponite, smectite, hectorite, and illite.

9. The slurry of claim 8, wherein polymers having monomers selected from the group consisting of acrylate, vinylacetate and maleic anhydride are present.

10. The slurry of claim 1, wherein said viscosifier is selected from the group consisting of a fuller's earth, zeolitic clay, and attapulgite clay in a concentration of at least 4 pounds per barrel of said slurry and no more than 60 pounds per barrel of said slurry.

11. The slurry of claim 1, wherein at least 10% of said particles will pass a 100 standard sieve mesh but will be retained on a 200 standard sieve mesh.

12. A method of carrying out operations in a bore hole extending into the subsurface formations, comprising the steps of forming a slurry comprising a liquid fluid; a sealing agent of ground peanut hulls of particles of a size distribution such that at least 30% but no more than 80% of said particles will be retained on a 100 standard sieve mesh; and a viscosifier to carry and suspend said sealing agent, and circulating said slurry in said bore hole.

13. A method of drilling a bore hole in subsurface formations, comprising the steps of forming a slurry comprising a liquid fluid; a sealing agent of ground peanut hulls of particles of a size distribution such that at least 30% but no more than 80% of said particles will be retained on a 100 standard sieve mesh; and a viscosifier to carry and suspend said sealing agent, and circulating said slurry in said bore hole.

14. A method of completing a bore hole formed into the subsurface formations, comprising the steps of forming a slurry comprising a liquid fluid; a sealing agent of ground peanut hulls of particles of a size distribution such that at least 30% but no more than 80% of said particles will be retained on a 100 standard sieve mesh; and a viscosifier to carry and suspend said sealing agent, and circulating said slurry in said bore hole.

15. A dry mixture for mixing with a fluid to be circulated in a bore hole, comprising: a sealing agent of ground peanut hulls of particles of a size distribution such that at least 30% but no more than 80% of said particles will retained on a 100 standard sieve mesh, and a viscosifier to carry and suspend said sealing agent.

16. The dry mixture of claim 15, wherein at least 10% of said particles will be retained on a 100 standard sieve mesh.

17. The dry mixture of claim 16, wherein at least 10% of said particles will pass a 50 standard sieve mesh.

18. The dry mixture of claim 15, wherein at least 10% of said particles will pass a 100 standard sieve mesh but will be retained on a 200 standard sieve mesh.

* * * * *